(12) United States Patent
Kim (10) Patent No.: US 11,845,495 B2
(45) Date of Patent: Dec. 19, 2023

(54) HOOD MOUNTING STRUCTURE (71) Applicants: HYUNDAI MOTOR COMPANY, Seoul (KR); KIA MOTORS CORPORATION, Seoul (KR)

(72) Inventor: Eonpyo Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 314 days.

(21) Appl. No.: 17/204,482

(22) Filed: Mar. 17, 2021

(65) Prior Publication Data
US 2022/0185384 A1 Jun. 16, 2022

(30) Foreign Application Priority Data
Dec. 16, 2020 (KR) .................... 10-2020-0176166

(51) Int. Cl.
*B62D 25/12* (2006.01)
*B62D 25/02* (2006.01)
*B62D 25/04* (2006.01)

(52) U.S. Cl.
CPC ............. *B62D 25/12* (2013.01); *B62D 25/02* (2013.01); *B62D 25/04* (2013.01)

(58) Field of Classification Search
CPC ........ B62D 25/12; B62D 25/02; B62D 25/04; B62D 25/105; B62D 25/16; B62D 27/065; B60R 2021/343; B60Y 2304/07; B60Y 2306/01; E05Y 2900/536; E05D 1/00; E05D 1/02
See application file for complete search history.

(56) References Cited

U.S. PATENT DOCUMENTS

| 4,727,621 | A  | * | 3/1988  | Emery ..................... E05D 3/125 |
| | | | | 16/388 |
| 6,296,418 | B1 | * | 10/2001 | Birkwald ........... B60G 21/0551 |
| | | | | 403/11 |
| 7,984,943 | B2 | * | 7/2011  | Iwano .................. B62D 25/105 |
| | | | | 296/193.11 |
| 8,579,061 | B2 | * | 11/2013 | Radomski .............. B62D 25/12 |
| | | | | 180/274 |
| 8,882,152 | B2 | * | 11/2014 | Rund ................... B62D 25/168 |
| | | | | 280/847 |
| 9,079,617 | B1 | * | 7/2015  | Lueschen ............. B62D 29/008 |
| 9,114,835 | B1 | * | 8/2015  | Stojkovic ............. B62D 25/082 |
| 9,701,274 | B2 | * | 7/2017  | Mildner ................. B62D 25/12 |
| 9,701,343 | B2 | * | 7/2017  | Sakai ................... B62D 21/152 |
| 9,809,256 | B1 | * | 11/2017 | Stojkovic ................ B60R 19/52 |

(Continued)

FOREIGN PATENT DOCUMENTS

| CN | 108177696 | A | * | 6/2018 | ............. B62D 25/02 |
| CN | 113386862 | A | * | 9/2021 | ............. B62D 25/02 |

(Continued)

*Primary Examiner* — James A Shriver, II
*Assistant Examiner* — Michael T. Walsh
(74) *Attorney, Agent, or Firm* — LEMPIA SUMMERFIELD KATZ LLC (57) ABSTRACT A hood mounting structure includes: a fender apron upper member provided along a length direction of a vehicle body; a hood disposed on a front portion of the vehicle body; and a hood hinge including a hinge upper arm connected to a lower part of the hood and a hinge lower arm mounted on a side of the fender apron upper member.

10 Claims, 7 Drawing Sheets

(56) References Cited

U.S. PATENT DOCUMENTS

| | | | | |
|---|---|---|---|---|
| 10,471,999 B2 * | 11/2019 | Yamamoto | ............ | B62D 25/082 |
| 10,556,626 B2 * | 2/2020 | Nakamura | ............. | B62D 25/08 |
| 10,870,451 B2 * | 12/2020 | Kondo | ................... | B62D 25/08 |
| 11,473,358 B2 * | 10/2022 | Schabenberger | ....... | E05D 3/145 |

FOREIGN PATENT DOCUMENTS

| | | | | |
|---|---|---|---|---|
| FR | 3123297 A1 * | 12/2022 | | |
| RU | 2685954 C2 * | 4/2019 | ............. | B62D 25/04 |
| WO | WO-2011098110 A1 * | 8/2011 | ........... | B62D 25/082 |

* cited by examiner

HOOD MOUNTING STRUCTURE

CROSS-REFERENCE TO RELATED APPLICATION

This application claims priority to and the benefit of Korean Patent Application No. 10-2020-0176166, filed on Dec. 16, 2020, the entire contents of which are incorporated herein by reference.

FIELD

The present disclosure relates to a hood mounting structure.

BACKGROUND

The statements in this section merely provide background information related to the present disclosure and may not constitute prior art.

The hood is provided in the front of the vehicle body and covers the engine room of the vehicle body.

In general, hood hinges are mounted on the upper member of the fender apron upper member and the lower part of the hood so that the hood can be opened and closed.

Figure 1:
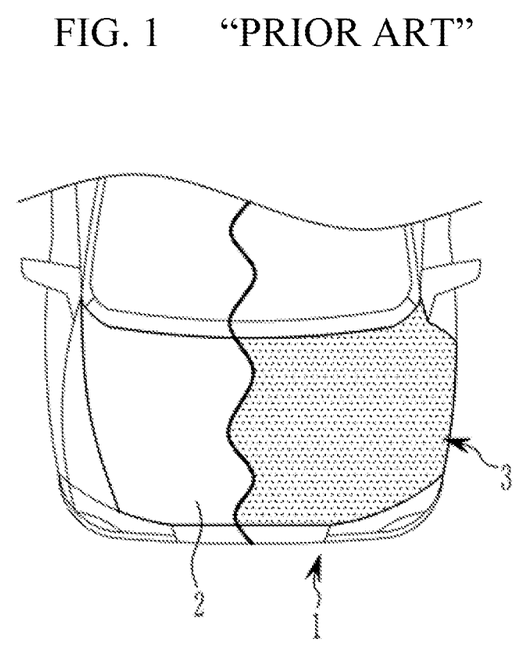
FIG. 1 is a drawing for comparison between a general hood mount vehicle and a vehicle equipped with a clamshell hood.

FIG. 1 is a drawing for comparison between a general hood mount vehicle and a vehicle equipped with a clamshell hood.

A general hood 2 applied to a vehicle body 1 is shown on the left side of FIG. 1, and a clamshell hood 3 is shown on the right side of the drawing.

In the case of the vehicle body 1 with the general hood 2, a hinge upper arm mounting part is positioned inside an upper member of a fender apron, and a hinge lower arm mounting part is positioned outside an exterior of the hood 2 so that in the closed state of the hood 2, bolting one mounting part is possible, and the other mounting part can be assembled in the open state of the hood 2.

In the case of vehicle body 1 with the clamshell hood 3, the fender is composed of a small size as the clamshell hood 3 covers a side wall of the fender. Due to the characteristic of the clamshell hood, the exterior of the hood 3 extends significantly outward, and the position of the hood hinge arm is moved to the outside to provide the strength of the hood panel.

Therefore, the hinge upper arm mounting part is positioned on the upper member of the fender apron to provide the strength of the hood panel, the hinge lower arm mounting part is positioned inside the hood exterior, and when the hood is closed, bolting for connection between the hinge and the vehicle body may be impossible.

The above information disclosed in this Background section is only for enhancement of understanding of the background of the disclosure, and therefore it may contain information that does not form the prior art that is already known to a person of ordinary skill in the art.

SUMMARY

The present disclosure provides a hood mounting structure with improved assemblability.

A hood mounting structure according to one form of the present disclosure may include a fender apron upper member provided along a length direction of a vehicle body, a hood disposed on a front of the vehicle body, and a hood hinge including a hinge upper arm connected to the lower part of the hood and a hinge lower arm mounted on a side of the fender apron upper member.

A hood mounting structure may further include a hood hinge accommodating portion configured to accommodate the hood hinge and formed on an upper portion of the fender apron upper member.

The fender apron upper member may include a fender apron upper inner member disposed on an inside of the vehicle body, and a fender apron upper outer member coupled to the fender apron upper inner member and including the hood hinge accommodating portion.

The fender apron upper outer member may include a flange portion coupled to the fender apron upper inner member, a side portion on which the hinge lower arm is mounted, and a connecting portion that connects the flange portion and the side portion and is formed concavely.

An upper part of the connecting portion and the lower part of the hood may be spaced apart at a predetermined distance.

The hood may include a side end that extends to a lower position than the connecting portion.

The fender apron upper member may have a cross-section in the shape of "L".

The hood mounting structure according to one form of the present disclosure may further include a bulk head provided inside the fender apron upper member.

The fender apron upper member may include at least one engage tool hole formed toward a mount direction of the hinge upper arm that is connected to the lower part of the hood.

The at least one engage tool hole may include a plurality of engage tool holes, and the hood mounting structure may further include a bulk head provided between the plurality of engage tool holes inside the fender apron upper member.

The fender apron upper member may include a rear upper end portion, and an A-pillar upper member disposed at a rear of the fender apron upper member, wherein the rear upper end portion and is continuously connected to the front upper end portion of the A-pillar upper member.

According to the hood mounting structure according to one form of the present disclosure, the hinge lower arm is mounted on the side of the fender apron upper member so that bolting for connecting the hinge and the vehicle body is easy, and the strength of the hood is provided.

According to the hood mounting structure according to one form of the present disclosure, it is possible to engage the hood while the hood is covered by forming an engage tool hole in the fender apron upper member, so it is easy to adjust the gap and flush between the hood and the vehicle body.

According to the hood mounting structure according to one form of the present disclosure, the cross-section of the fender apron upper member and the A-pillar upper member are continuously connected to improve the load path in the event of a collision.

According to the hood mounting structure according to one form of the present disclosure, by providing a certain space between the fender apron upper member and the hood, it is possible to reduce pedestrian injuries during a vehicle collision.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the drawings, the thickness of layers, films, panels, regions, etc., are exaggerated for clarity.

When a part such as a layer, film, region, or plate is said to be "on" another part, this includes not only the case directly above the other part, but also the case where there is another part in between.

In contrast, when an element is referred to as being "directly on" another element, there are no intervening elements present.

Throughout the specification, when a part "includes" a certain component, it means that other components may be further included rather than excluding other components unless specifically stated to the contrary.

One form of the present disclosure will hereinafter be described in detail with reference to the accompanying drawings.

Figure 2:
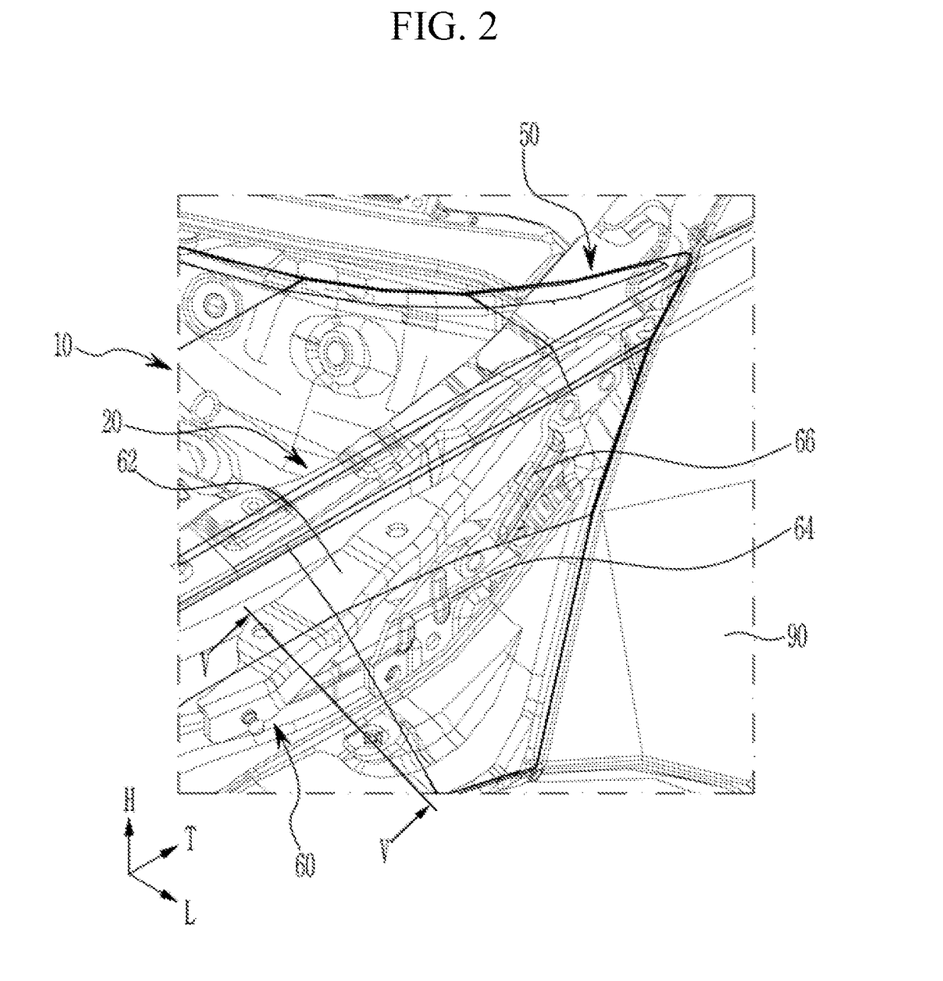
FIG. 2 is a perspective view of a hood mounting structure according to one form of the present disclosure.
Figure 3:
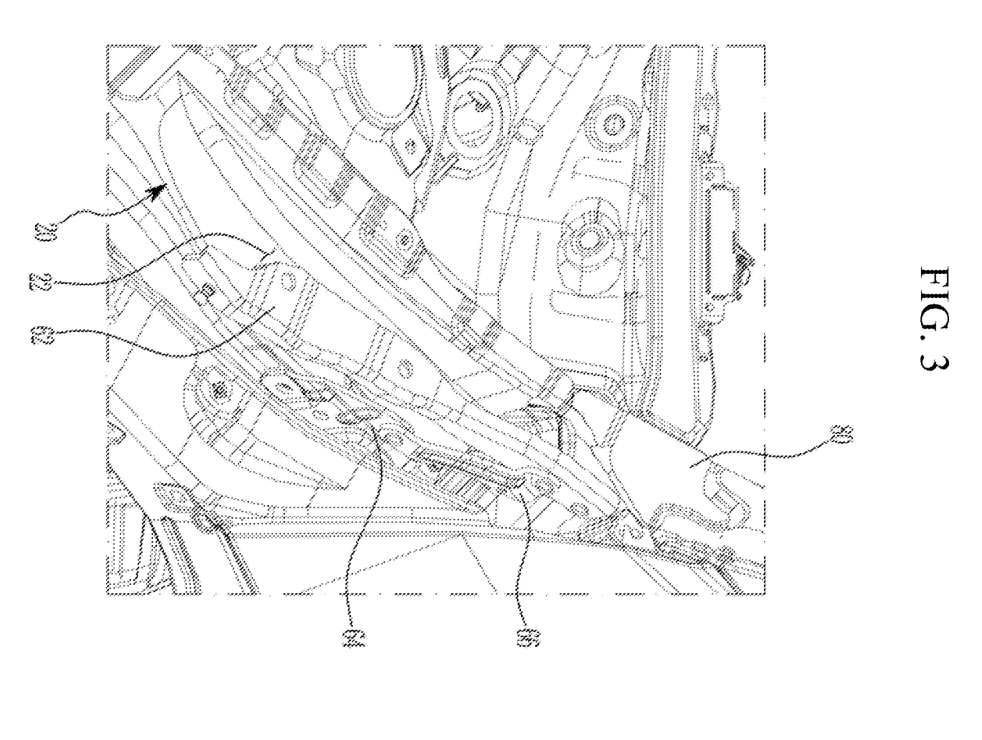
FIG. 3 to FIG. 5 is a partial perspective view of the hood mounting structure according to one form of the present disclosure.
Figure 4:
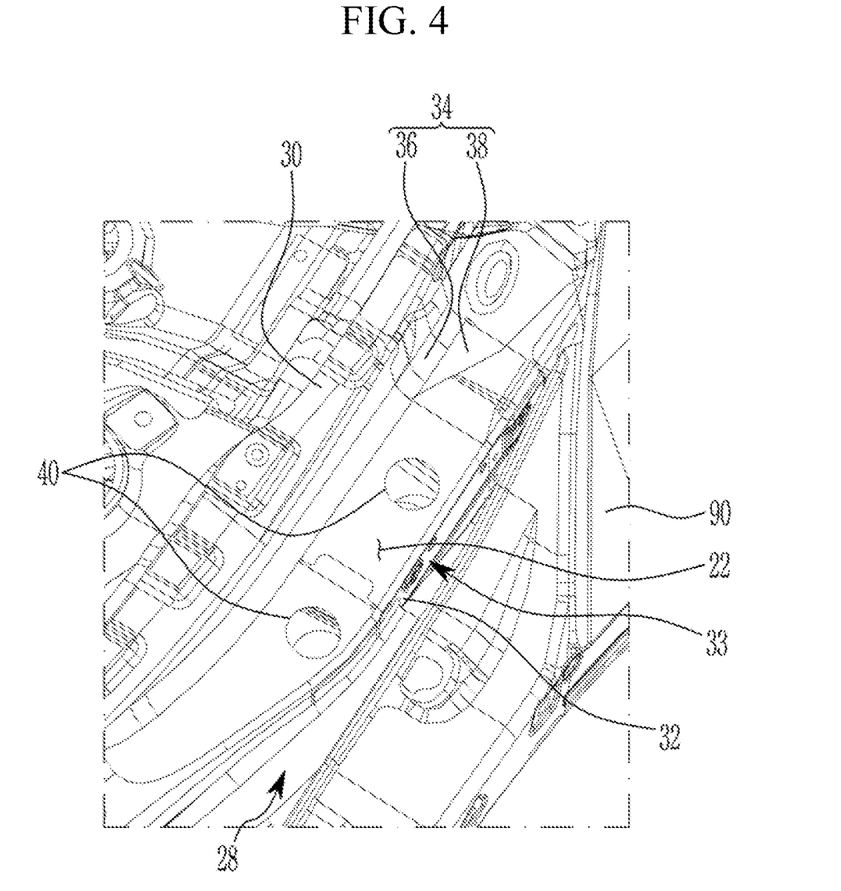
Figure 5:
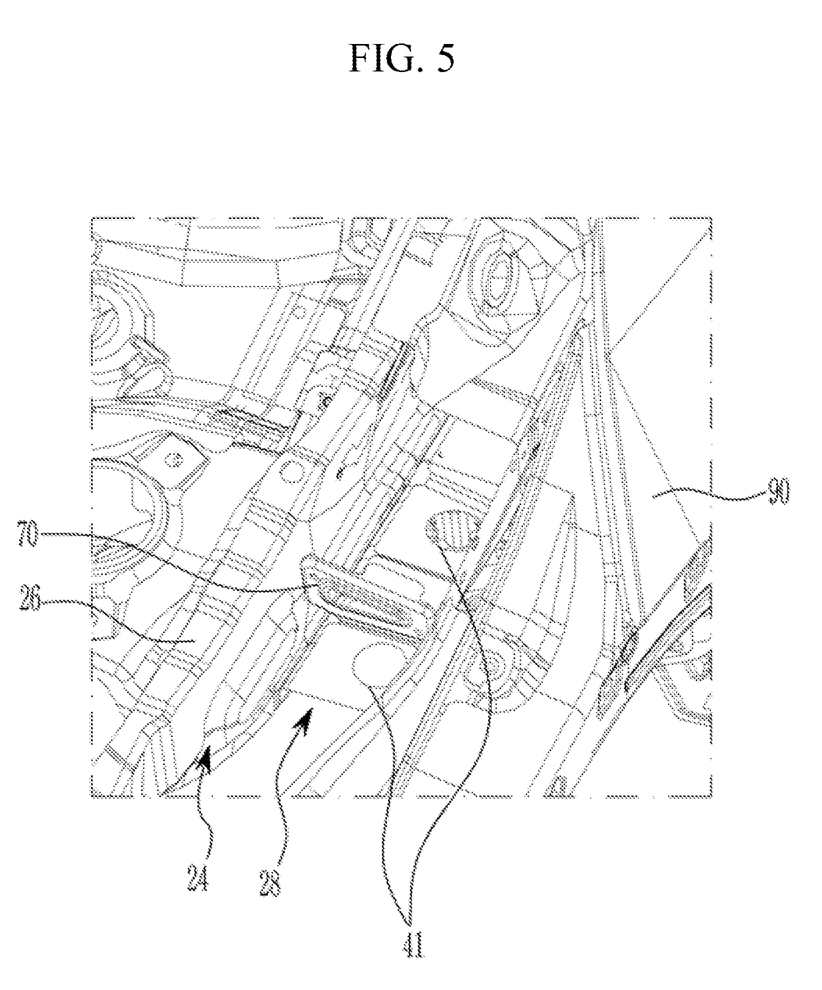
Figure 6:
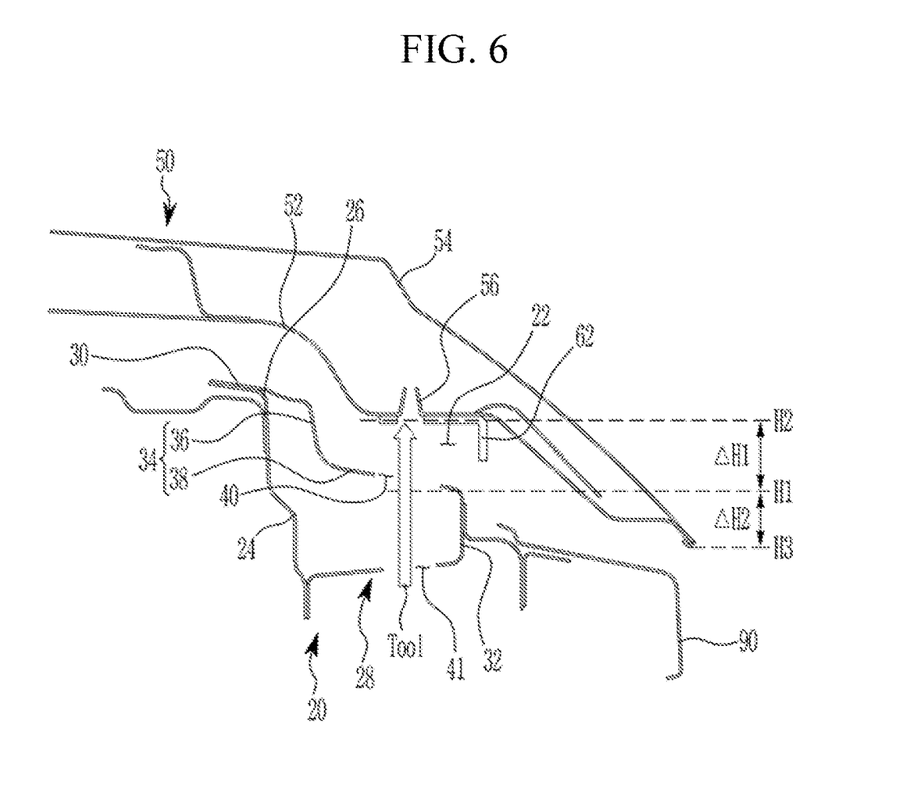
FIG. 6 is a cross-sectional view along the line V-V of FIG. 2.

FIG. 2 is a perspective view of a hood mounting structure according to one form of the present disclosure, FIG. 3 to FIG. 5 is a partial perspective view of the hood mounting structure according to one form of the present disclosure, and FIG. 6 is a cross-sectional view along the line V-V of FIG. 2.

In FIG. 2, T means the length direction of the vehicle body, H means the height direction of the vehicle body, and L means the width direction of the vehicle body.

Referring to FIG. 2 to FIG. 6, a hood mounting structure according to one form of the present disclosure includes a fender apron upper member 20 provided along the length direction T of the vehicle body 10, a hood disposed on the front upper part of the vehicle body 10, and a hood hinge 60 that mounts the hood 50 to the fender apron upper member 20.

A fender 90 forming the vehicle body 10 is provided under the hood 50.

The hood 50 may include a hood inner panel 52 and a hood outer panel 54 that joins with the hood inner panel 52.

The hood hinge 60 includes a hinge upper arm 62 connected to the bottom of the hood 50 and a hinge lower arm 64 mounted on the side of the fender apron upper member 20. The hood hinge 60 may further include a hinge link 66 connecting the hinge upper arm 62 and the hinge lower arm 64.

A hood hinge accommodating portion 22 accommodating the hood hinge 60 may be formed on an upper portion of the fender apron upper member 20.

The fender apron upper member 20 may include a fender apron upper inner member 24 disposed inside of the vehicle body 10, and a fender apron upper outer member 28 coupled with the fender apron upper inner member 24 and on which the hood hinge accommodating portion 22 is formed thereon.

The fender apron upper outer member 28 includes a flange portion 30 coupled with the fender apron upper inner member 24, a side portion 32 on which the hinge lower arm 64 is mounted, and a connecting portion 34 that connects the flange portion 30 and the side portion 32 and is formed concave to the inside thereof.

The fender apron upper inner member 24 includes a fender apron upper inner flange 26, and the flange portion 30 of the fender apron upper outer member 28 may be coupled with the fender apron upper inner flange 26.

The hood mounting structure according to one form of the present disclosure may further include a bulk head 70 provided inside the fender apron upper member 20.

That is, the bulk head 70 is provided in the connecting portion 34 of the fender apron upper outer member 28, so that the strength of the fender apron upper member 20 can be increased.

A hinge lower arm mounting portion 33 is formed on the side portion 32 so that the hinge lower arm 64 can be mounted thereon.

The connecting portion 34 may include an upper connecting portion 36 curved at the flange portion 30 and a lower connecting portion 38 curved from the upper connecting portion 36 and connected to the side portion 32. The space formed by the upper connecting portion 36 and the lower connecting portion 38 may be defined as the hood hinge accommodating portion 22.

That is, as shown in FIG. 6, the fender apron upper member 20 including the upper connecting portion 36, the lower connecting portion 38, the side portion 32 and the fender apron upper member 24 may have its cross-section in the shape of an "L".

Since the cross-section of the fender apron upper member 20 is formed in an "L" shape, a predetermined distance between the upper part of the connecting portion 34 and the lower part of the hood 50, that is, the hood inner panel 52 may be $\Delta H1$.

That is, as shown in FIG. 6, the reference height $H2$ of the hinge upper arm 62 connected to the hood inner panel 52 from the reference height $H1$ of the lower connecting portion 38 is a certain length apart $\Delta H1$. This provides a space in which the hood 50 can be deformed in the event of a vehicle collision, which may reduce pedestrian injuries.

The end of the hood 50 may extend lower than the connecting portion 34. That is, the hood 50 may be a clamshell hood in which the height $H3$ of one end of the side surface is lower than the reference height $H1$ of lower connecting portion 38 ($\Delta H2$).

Referring to FIG. 4 to FIG. 6, engage tool holes 40, and 41 may be formed in the fender apron upper member 20 toward the mount direction of the hinge upper arm 62 connected to the lower part of the hood 50.

The engage tool holes 40, 41 may be formed in plural.

The hood inner panel 52 of the hood 50 may have a hood engage portion 56 formed thereon, and the hinge upper arm 62 may be engaged with the hood engage portion 56.

In the mounting structure of a general clamshell hood, it is difficult to engage the hinge upper arm due to interference of the hood while the hood is covered. If the hinge upper arm and the hood are engaged with while the hood is opened, the vehicle quality may be deteriorated due to the occurrence of gap and flush.

However, in one form of the present disclosure, the engage tool holes 40, 41 are formed on the fender apron upper member 20 toward the hood engage portion 56. Thus, with the hood 50 covered, it is possible to engage by inserting the engage tool from the bottom of the vehicle body 10 into the engage tool holes 40, and 41. With the hood 50 covered, the hinge upper arm 62 can be engaged with the engage portion 56 to suppress gaps and flushes.

The bulk head 70 is provided inside the fender apron upper member 20 between the engage tool holes 40, 41 to increase the strength of the fender apron upper member 20. The strength of the fender apron upper member 20 may be deteriorated by the engage tool holes 40, 41 formed in the fender apron upper member 20, but the strength of the fender apron upper member 20 may be provided by the bulk head 70.

Figure 7:
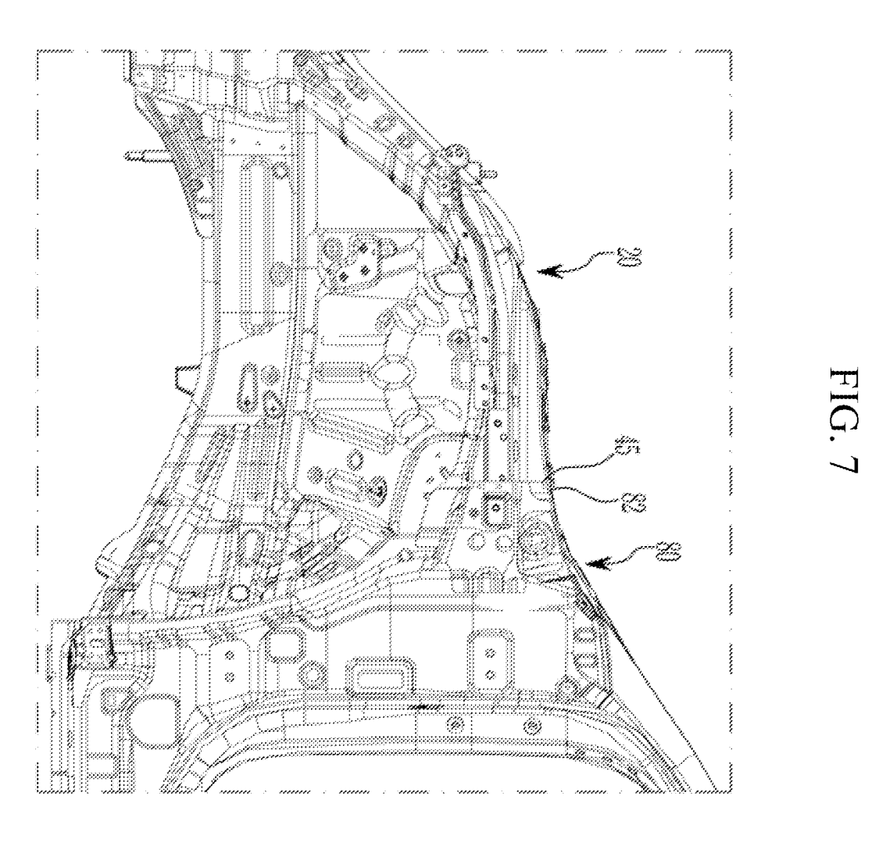
FIG. 7 is a partial side view of a hood mounting structure according to one form of the present disclosure.

FIG. 7 is a partial side view of a hood mounting structure according to one form of the present disclosure.

A rear upper end portion 45 of the fender apron upper member 20 may be continuously connected to a front upper end portion 82 of an A-pillar upper member 80 disposed at the rear of the fender apron upper member 20.

The connection between the fender apron upper member 20 and the A-pillar upper member 80 is continuously formed to facilitate the transmission of the collision load in the event of a collision, and to suppress the deformation of the vehicle body 10.

As described above, according to the hood mounting structure according to one form of the present disclosure, the hinge lower arm is mounted on the side of the fender apron upper member to facilitate bolting for connection between the hinge and the vehicle body, and to increase the strength of the hood. In addition, the possibility of interference between the hood hinge and the vehicle body or hood can be reduced.

According to the hood mounting structure according to one form of the present disclosure, it is possible to engage the hood while the hood is covered by forming an engage tool hole in the fender apron upper member, so it is easy to adjust the gaps and flushes between the hood and the vehicle body.

According to the hood mounting structure according to one form of the present disclosure, the cross-section of the fender apron upper member and the A-pillar upper member are continuously connected to improve the road path in case of collision, and the response to small overlap is enhanced.

According to the hood mounting structure according to one form of the present disclosure, by providing a certain space between the fender apron upper member and the hood lower, it is possible to reduce pedestrian injuries during a vehicle collision.

According to the hood mounting structure according to one form of the present disclosure, the hood mounting work can be easily performed even in a short overhang vehicle with a short distance between the front shock absorber cover and the cowl.

According to the hood mounting structure according to one form of the present disclosure, sufficient hood strength can be provided by configuring the hood hinge to the outermost side of the vehicle width direction for the vehicle to which the clamshell hood is applied.

According to the hood mounting structure according to one form of the present disclosure, since it is possible to assemble while the hood is closed, it is easy to adjust the simple difference between the hood and the fender and the hood and the bumper.

While this disclosure has been described in connection with what is presently considered to be practical exemplary forms, it is to be understood that the disclosure is not limited to the disclosed forms.

<Description of symbols>

| | |
|---|---|
| 10: vehicle body | 20: fender apron upper member |
| 22: hood hinge accommodating portion | 32: side portion |
| 24: fender apron upper inner member | 34: connecting portion |
| 26: fender apron upper inner flange | 38: lower connecting portion |
| 28: fender apron upper outer member | 45: rear upper end portion |
| 30: flange portion | 52: hood inner panel |
| 33: hinge lower arm mounting portion | 56: hood engage portion |
| 36: upper connecting portion | 62: hinge upper arm |
| 40, 41: engage tool hole | 66: hinge link |
| 50: hood | 80: A-pillar upper member |
| 54: hood outer panel | 90: fender |
| 60: hood hinge | |
| 64: hinge lower arm | |
| 70: bulk head | |
| 82: front upper end portion | |

What is claimed is:

1. A hood mounting structure comprising:
   a fender apron upper member provided along a length direction of a vehicle body;
   a hood disposed on a front part of the vehicle body; and
   a hood hinge including a hinge upper arm connected to a lower part of the hood and a hinge lower arm mounted on a side of the fender apron upper member,
   wherein the fender apron upper member further comprises at least one engage tool hole formed toward a mount direction of the hinge upper arm, and the at least one engage tool hole is configured to receive a tool to engage the hinge upper arm to the hood when the hood is closed.

2. The hood mounting structure of claim 1, further comprising a hood hinge accommodating portion configured to accommodate the hood hinge and formed on an upper portion of the fender apron upper member.

3. The hood mounting structure of claim 2, wherein the fender apron upper member comprises:
   a fender apron upper inner member disposed on an inside of the vehicle body; and
   a fender apron upper outer member coupled to the fender apron upper inner member and including the hood hinge accommodating portion.

4. The hood mounting structure of claim 3, wherein the fender apron upper outer member comprises:
   a flange portion coupled to the fender apron upper inner member;
   a side portion on which the hinge lower arm is mounted; and
   a connecting portion that connects the flange portion and the side portion and is formed concavely.

5. The hood mounting structure of claim 4, wherein an upper part of the connecting portion and the lower part of the hood are spaced apart at a predetermined distance.

6. The hood mounting structure of claim 4, wherein the hood includes a side end extending to a lower position than the connecting portion.

7. The hood mounting structure of claim 1, wherein the fender apron upper member has a cross-section in a shape of "L".

8. The hood mounting structure of claim 1, further comprising a bulk head provided inside the fender apron upper member.

9. The hood mounting structure of claim 1, wherein the at least one engage tool hole includes a plurality of engage tool holes, and the hood mounting structure further comprises a bulk head provided between the plurality of engage tool holes inside the fender apron upper member.

10. The hood mounting structure of claim 1, wherein the fender apron upper member comprises:

a rear upper end portion; and an A-pillar upper member disposed at a rear of the fender apron upper member and including a front upper end portion, wherein the rear upper end portion is continuously connected to the front upper end portion of the A-pillar upper member.

* * * * *